(12) United States Patent
Bandlamudi et al.

(10) Patent No.: US 8,755,274 B2
(45) Date of Patent: Jun. 17, 2014

(54) ADAPTIVE DATA RATE LIMITER IN A WIRELESS COMMUNICATION DEVICE

(75) Inventors: Vamsi Krishna Bandlamudi, Karnataka (IN); Jeelan Poola, Karnataka (IN); Sundaresan Sundaram, Karnataka (IN)

(73) Assignee: Motorola Solutions, Inc., Schaumburg, IL (US)

( * ) Notice: Subject to any disclaimer, the term of this patent is extended or adjusted under 35 U.S.C. 154(b) by 173 days.

(21) Appl. No.: 13/300,568

(22) Filed: Nov. 19, 2011

(65) Prior Publication Data

US 2013/0128731 A1    May 23, 2013

(51) Int. Cl.
    *H04L 12/26* (2006.01)
(52) U.S. Cl.
    USPC ........................................... 370/230
(58) Field of Classification Search
    USPC .................................... 370/230, 229
    See application file for complete search history.

(56) References Cited

U.S. PATENT DOCUMENTS

| | | | |
|---|---|---|---|
| 7,440,572 B2 * | 10/2008 | Dellmo et al. | 380/270 |
| 7,441,126 B2 * | 10/2008 | Dellmo et al. | 713/194 |
| 7,630,309 B1 * | 12/2009 | Lim et al. | 370/230.1 |
| 7,729,241 B2 * | 6/2010 | Winter | 370/229 |
| 7,746,903 B2 * | 6/2010 | Klish, II | 370/477 |
| 7,808,908 B1 * | 10/2010 | Bharghavan et al. | 370/235 |
| 8,000,244 B1 * | 8/2011 | Canion et al. | 370/235 |
| 8,023,482 B2 * | 9/2011 | Gong et al. | 370/338 |
| 2001/0024452 A1 * | 9/2001 | Liu et al. | 370/468 |
| 2002/0094087 A1 * | 7/2002 | Dellmo et al. | 380/270 |
| 2002/0095594 A1 * | 7/2002 | Dellmo et al. | 713/200 |
| 2006/0126509 A1 * | 6/2006 | Abi-Nassif et al. | 370/235 |
| 2007/0028099 A1 * | 2/2007 | Entin et al. | 713/163 |
| 2010/0214925 A1 * | 8/2010 | Gormley | 370/235.1 |
| 2010/0248763 A1 * | 9/2010 | Aaron et al. | 455/509 |
| 2011/0096741 A1 * | 4/2011 | Strahm et al. | 370/329 |

* cited by examiner

*Primary Examiner* — Chirag Shah
*Assistant Examiner* — Jael Ulysse
(74) *Attorney, Agent, or Firm* — Brian M. Mancini

(57) ABSTRACT

A method and system for adaptive data rate-limiting includes a processor (112) operable to process data at a maximum data processing rate among at least one cryptographic algorithm. A data rate limiter (116) is operable to weight the processing rate of each cryptographic algorithm by a predetermined factor for adapting a data rate of a transceiver of the communication device by the processor based on the at least one cryptographic algorithm being used in the communication device (100) and its associated weighted processing rate.

14 Claims, 2 Drawing Sheets

_US 8,755,274 B2_

ADAPTIVE DATA RATE LIMITER IN A WIRELESS COMMUNICATION DEVICE

FIELD OF THE DISCLOSURE

The present invention relates generally to wireless communication devices, and more particularly to data rates in wireless communication devices.

BACKGROUND

With the advent of higher data rate wireless communication networks, wireless devices are required to provide higher data processing speeds. This can be a problem for real-time communications, such as for voice or video data. The problem can be compounded where data must be intensively processed by a wireless communication device, such as when providing software encryption of the data.

Cryptographic algorithms require a great amount of computational power. As a result, cryptographic modules, and particularly those that are implemented completely in software are very processing-intensive. In addition, the computation requirements can vary based on the encryption/decryption algorithm being used. Network security modules such as Internet Protocol Security (IPSec), whose implementation relies on software cryptography, need to address the heavy processor load that using these modules bring with them. Further, the use of a data tunnel mode requires both encryption/decryption and hashing algorithms to be applied on an Encapsulating Security Protocol (ESP) packet. These combined requirements put even more load on the processor.

As a result, real-time networking devices can process much more normal unencrypted data traffic as compared to data traffic that requires software cryptography security like IPSec. For example a device which can handle 1 Gbps of normal unencrypted traffic, may only be able to handle 100 Mbps of IPSec/ESP traffic based on the software cryptography implementation. So when the device is handling ESP traffic at the maximum rate that it can handle, the processor is at full load (at 100%). In this state the entire processor is taken by software cryptography and any user space processes are starved for processor time. However, for stable operation real-time networking devices require some processor time to be periodically available for user space processes. For example, on a Linux based real-time device, the process "is_Diag" requires some processing time to ping the watchdog and keep the device alive. If "is_Diag" does not get any time on the processor and hence does not ping the watchdog, then the device reboots, which is unacceptable.

It is also necessary to ensure that the device can handle normal traffic at desired data rates along with traffic that requires cryptographic processing (like IPSec) in order to avoid network congestion. Therefore, it must be ensured that software cryptography module does not take up the entire processor load.

Accordingly, there is a need for new data rate limiting technique which automatically adapts to the cryptographic algorithms and features in use at any time on the wireless device to limit the amount of data processed by software cryptography, such that only a portion of the available processor load is taken at all times.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
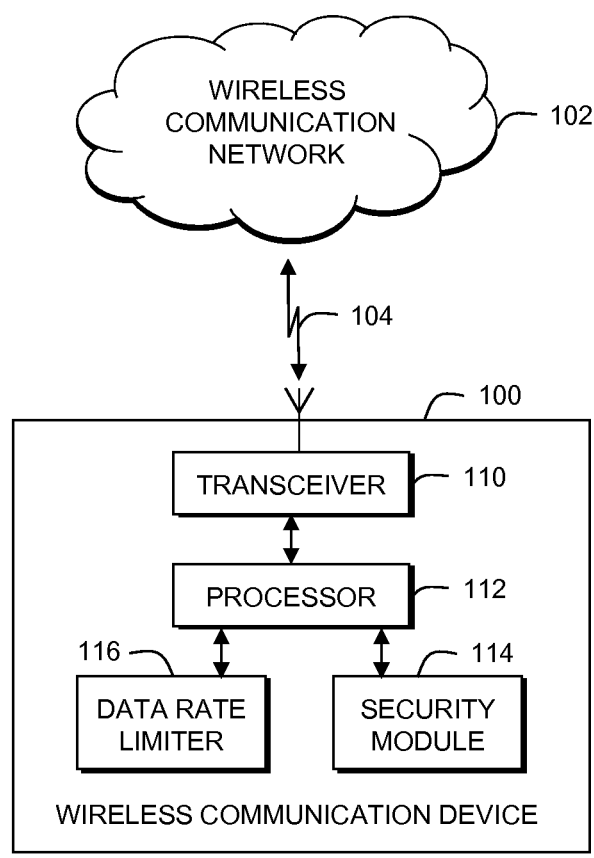
FIG. 1 is a simplified block diagram of a device, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system and method is described for a new technique that adaptively limits the amount of data processed by software cryptography, such that only a portion of the available processor load is taken. In particular, the present invention introduces automatic adaptive rate-limiting for data, based on the cryptographic algorithm or algorithm-combination being used, in order that the software cryptography module does not take up all the available processor power.

In practice, a networking device has to apply different algorithm-sets to different packets. For example, multiple IPSec tunnels may be active with each tunnel using a different algorithm combination, such as Advanced Encryption Standard, Secure Hash Algorithm, Triple Data Encryption Standard, Message-Digest Algorithm (AES-128/SHA1, 3DES/MD5, etc.) or a NULL algorithm. Each combination has a different maximum data rate based on 100% processor usage. For example, the maximum date rate with AES-128/SHA1 is greater than DES/SHA1 which is greater than 3DES/MD5. In accordance with the present invention, the software cryptographic module is data rate limited based on the maximum data rate that can be supported by the slowest security algorithm-combination in use. Further, the in-use algorithm-combinations can keep changing based on tunnels added or deleted, and therefore the rate limiter of the present invention adapts to such changes by automatically changing the data rate based on in-use algorithms.

FIG. 1 is a block diagram depiction of a wireless communication device for adaptive data rate-limiting, in accordance with the present invention. The communication device 100 can exchange a plurality of different communication streams 104 with a wired or wireless communication network 102. The communication device 100 includes a transceiver 110, a processor 112, and a security module 114 operable to execute a variety of cryptographic algorithms as are known in the art. The processor is also coupled to a data rate limiter 116 operable in accordance with the present invention and as will be detailed below.

The device and wireless communication network are operable on either or both of local and wide-area networks, or other IEEE 802.11 wireless communication systems. However, it should be recognized that the present invention can also be applied to other wired or wireless communication systems. For example, the description that follows can apply to one or more communication networks that are IEEE 802.xx-based, employing wireless technologies such as IEEE's 802.11, 802.16, or 802.20, or Internet-based, modified to implement embodiments of the present invention. The protocols and messaging needed to establish such networks are known in the art and will not be presented here for the sake of brevity.

Various entities are adapted to support the inventive concepts of the embodiments of the present invention. Those skilled in the art will recognize that FIG. 1 does not depict all of the equipment necessary for system to operate but only those system components and logical entities particularly relevant to the description of embodiments herein. For example, routers, controllers, switches, access points/ports, and wireless clients can all include separate communication interfaces, transceivers, memories, etc. all under control of a central processor unit (CPU). In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted and modified, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components. In particular, the security module and data rate limiter could be embodied with the processor.

Referring back to FIG. 1, the communication device 100 is operable to change the data rate of its communication stream(s) 104 adaptively based on the slowest security algorithm-combination in use. In order to accomplish this, maximum data processing rate supported by the processor 112 (at 100% load) for all security algorithm-combination has to be known. This can be performed individually for multiple communication streams 104 for the device, such as tunneled streams to the wireless communication network 102, if present. The maximum data processing rate for a communication stream can be arrived at using manual or automatic techniques. In a manual technique, data traffic is sent on a communication stream with each available algorithm or algorithm-combination to find out at what data processing rate the processor utilization is 100%, and then the maximum data processing rate of all of the tested algorithm or algorithm-combinations is chosen as the maximum data rate. In an automatic technique, the processor can determine how much processor time is needed to process a known amount of data using each available algorithm or algorithm-combination, and then choose the maximum data processing rate of all of the tested algorithm or algorithm-combinations. An automatic technique that can measure processor time taken, down to the required accuracy (micro/nano-seconds) is required for this.

In either of these techniques, a maximum data processing rate among all tested cryptography algorithm or algorithm-combinations will be determined that results in 100% processor utilization. However, it is not desirable to operate at this rate, since the processor will be unable to process any other user applications at this time, which could result in unstable device operation. Therefore, the present invention introduces a weight factor (%) that needs to be applied to the maximum processing rate value to arrive at a safe data processing rate at which the device is stable. This is defined herein as the global weight factor (GWF) and is always applied to the transceiver data rate to arrive at a safe threshold for the processor data processing rate. The GWF should have a maximum value that can be determined empirically to provide stable operation. In the embodiments described herein a GWF of 60-70% is sufficient. Although it should be recognized that users can be allowed to configure a value less than the maximum GWF.

Further, all of the different tested algorithm-combinations will have different maximum data processing rates. Therefore, in accordance with the present invention, each algorithm-combination is compared to the algorithm-combination that has the highest data processing rate and then assigned a relative weighting factor. For example, if the fastest algorithm-combination in the tested group has a maximum data processing rates of 100 Mbps, it will be assigned an algorithm weight factor (AWF) of 100%. If another tested algorithm-combination has a maximum data processing rate of 67 Mbps, it will be assigned an AWF of 67%, and so on for all the other tested algorithm-combinations.

The present invention uses the same relative AWF algorithm-combination scale for similar device platforms in order to avoid re-computation of all data processing rates when changing devices. For example, it is assumed that on similar platforms, but having different processor speeds, it will only be necessary to calculate the maximum data processing rate of the fastest algorithm-combination, and then apply the AWF scale for all other algorithm-combination that will be used on the device platform. In this way, the AWFs for all algorithm-combinations can be calculated one time for similar platforms, and then re-scaled by only testing one algorithm-combination when a device platform parameter (e.g. processor speed) is changed. However, it should be noted that if the device platform is changed, all the algorithm-combination data processing speeds must be re-established. For example, the AWFs calculated for a MIPS-Based™ platform will hold for similar platforms and different processor speeds, but the same is not true for an x86 device platform.

In accordance with the present invention, the final data rate limit of a device for an algorithm-combination is, $$\text{transceiver data rate} = (\text{max data processing rate} * GWF * AWF) \qquad \text{Eq. 1}$$

which is the data rate used for transceiver rate limiting. The AWFs can be calculated once for similar platforms if maximum data rate is arrived at manually like described above or at device start-up time in the case of the automatic calculation. If manual calculation is used, AWFs should be changed whenever a change in algorithm implementation can increase/decrease the performance of the algorithm and maximum data rate has to be calculated per platform.

AWF is derived from the slowest algorithm-combination that is in-use in the communication device. Firstly, the number of communication stream (tunnels) that use a given algorithm-combination is counted. This count is updated when a communication stream is added/deleted. For non-zero communication streams, the present invention then finds the algorithm-combination with the lowest AWF.

For example, when a new communication stream using an algorithm or algorithm-combination is added, the stream count is incremented, and if the new stream has an algorithm-combination with a slower processing rate than the previous slowest algorithm-combination, then the added algorithm-combination is updated as the slowest, and the AWF for that added algorithm-combination is used in Equation 1 to calculate the updated data rate limit for the transceiver. Similarly, when an existing communication stream using an algorithm or algorithm-combination is deleted, the stream count is decremented, and if that deleted algorithm-combination had the slowest processing rate (and the stream count is zero) than the remaining streams are examined for the algorithm-combination that is now the slowest, and the AWF for that algorithm-combination is then used in Equation 1 to calculate the updated data rate limit for the transceiver. Applying the AWF of slowest algorithm-combination in the formula from Equation 1, gives the current rate-limited data rate.

Example

Consider a communication device, such as a router, which provides IPSec/ESP security using software cryptography and it supports AES, DES and NULL ciphers and SHA1, MD5 digest algorithms. Assume maximum ESP data rates (100% processor utilization) for each algorithm-combination are calculated as shown in Table 1.

TABLE 1

Example data rates and factors for different algorithm combinations

| Algorithm-Combination (ESP) | Max data rate (Mbps at 100% CPU) GWF = 100 | 80% CPU GWF = 80 | 60% CPU GWF = 60 | AWF (algorithm-combination weight factor) |
|---|---|---|---|---|
| AES-128/SHA1 | 52 | 41 | 31 | 20 |
| AES-192/SHA1 | 47 | 38 | 28 | 18 |
| AES-256/SHA1 | 42 | 34 | 25 | 16 |
| 3DES/SHA1 | 15 | 12 | 9 | 5 |
| AES-128/MD5 | 61 | 49 | 37 | 23 |
| AES-192/MD5 | 53 | 42 | 32 | 20 |
| AES-256/MD5 | 47 | 38 | 28 | 18 |
| 3DES/MD5 | 16 | 13 | 10 | 6 |
| NULL/SHA1 | 168 | 134 | 100 | 65 |
| NULL/MD5 | 258 | 206 | 155 | 100 |

In this example, NULL/MD5 is the fastest algorithm-combination and this combination's throughput is the maximum possible on this platform. Therefore, the maximum data processing rate is 258 Mbps. With this as the reference maximum, the AWFs for each algorithm combination are represented as a percentage of the fastest algorithm combination as shown. In particular, the AWF for a given algorithm-combination can be calculated as $$AWF = (Ma/Mf)*100$$

where AWF is the Algorithm-combination weight factor of a given algorithm-combination, and where Ma is the maximum data processing rate (at 100% CPU usage) of the given algorithm-combination, and Mf is the maximum data processing rate (at 100% CPU usage) of the fastest algorithm-combination. From Eq. 1, the rate-limited throughput for a given algorithm combination is $$\text{transceiver data rate} = (Mf*AWF*GWF)$$

For example, if a given algorithm-combination is AES-128/SHA1, where AWF=20% and GWF=60%, then the transceiver rate-limited throughput is set to $$(258 \text{ Mbps}*20\%*60\%) = 30.96 \approx 31 \text{ Mbps}$$

The advantage with this kind of approach is that, for similar platforms, only the maximum data rate of the fastest algorithm-combination needs to be determined. Upon a change of device platform parameters (i.e. processor speed), the processor needs only to re-establish a maximum data rate of a fastest cryptographic algorithm, and utilize the previously determined AWFs for each of the various combinations of the at least one cryptographic algorithm. In other words, the same AWF scale can then be applied to find the given data rate for any algorithm-combination on that platform.

A platform (i.e. a device) is a combination of various hardware components like CPU, memory controller, memory, etc. The performance of a platform depends on the CPU architecture, CPU clock, cache size, memory controller, bus speed, memory clock and various other factors. Performance of the cryptographic algorithm on a given platform implemented in software also depends on how well the code is optimized for that platform. Therefore, the maximum data rates of algorithm-combinations and hence their AWFs change from platform to platform. For two platforms to be similar they should use the same CPU architecture (e.g., clock speed can change but cache size should be same). Therefore, AWFs calculated for a MIPS-Based™ architecture based platform may not be applicable for x86 architecture-based platforms and vice-versa.

If multiple communication streams (tunnels) are in use, then the data rate of the slowest algorithm-combination is used in the device. For example, if three communication stream (tunnels) are in use, each using AES-128/SHA1, NULL/MD5 and 3DES/MD5, respectively, then the fastest in-use algorithm-combination is NULL/MD5 and the slowest in-use algorithm-combination is 3DES/MD5 (from Table 1). If GWF is set at 60%, the current rate limiter data rate can be calculated from the formula in Equation 1 as, $$\text{transceiver data rate} = (258 \text{ Mbps}*60\%*6\%) = 9.3 \text{ Mbps}.$$

Therefore, the transceiver data rate, and accordingly, the software cryptography processing rate, will be rate limited to 9.3 Mbps. After some time if 3DES/MD5 is not in use then the slowest in-use algorithm combination is updated to AES-128/SHA1 and rate limiter data rate is increased to 30.96 Mbps. Afterwards, if a new 3DES/MD5 communication stream is used, the slowest in-use algorithm-combination will be updated to 3DES/MD5 and the rate limiter data rate is decreased to 9.3 Mbps.

It should be recognized that a device will have many features that can be enable/disabled based on the requirement of the user. Therefore, software cryptographic modules have to share available resources like processor time with other features. Depending on what features are enabled at a given point of time performance of software cryptographic module can be impacted. One way to solve this is to set the GWF for the worst case scenario when all features are enabled. However, in this case performance will be lower than what is possible when some features are disabled. Therefore, in accordance with a further embodiment of the present invention, processor usage can be monitored periodically and the GWF can be adjusted dynamically, so that the rate limiter takes the current load on the CPU into account.

For example, the processor load can be monitored every few seconds, and the data rate limit can be dynamically adjusted between a high and low value of GWF (i.e. GWF_hi, GWF_lo. In particular, for every X seconds:

if ((average CPU usage>Tcpu) and (GWF>GWF_lo)):
        reduce the GWF by a factor Rf to no less than GWF_lo, where Tcpu is a predetermined threshold, and X can be two to three seconds.

In addition, for every Y seconds:
if ((average CPU usage<Tcpu) and (GWF<GWF_hi)):
increase the GWF by a factor Rf to no more than GWF_hi, where Y should be considerably larger than X, e.g. sixty seconds. In this embodiment, the average CPU load is for the last two to three seconds.

Any congestion avoidance algorithm can be used with the rate limiter described herein. A simple leaky bucket can be used but the algorithm is not good for bursty traffic. For networking devices, if the device is already handling traffic close to the rate limit, there will be problems setting up Transmission Control Protocol (TCP) connections, as the three-way handshake packets will be dropped. As a result leaky bucket is not a good choice for this purpose. From various tests conducted, it is found that a Random Early Detection (RED) technique is suitable for congestion avoidance in the present invention. With RED, bursty traffic can be accommodated and there will not be a problem setting up TCP connections even at close to peak data rates.

Figure 2:
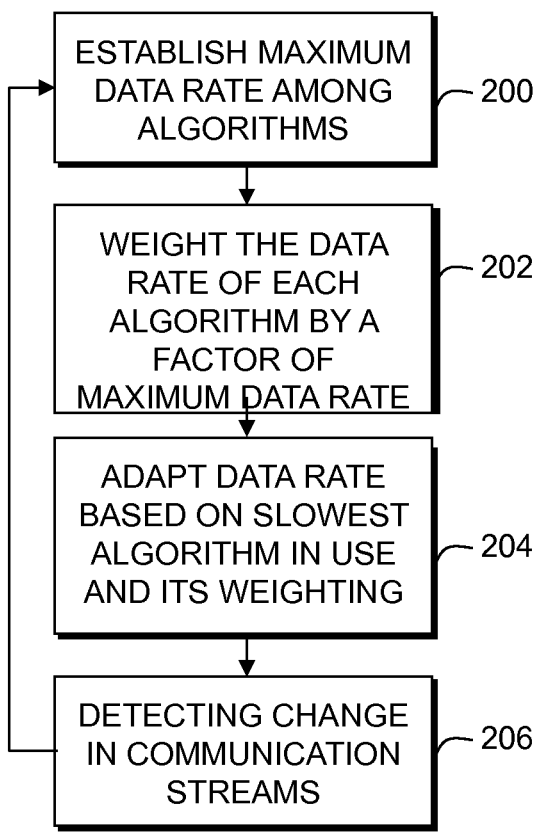
FIG. 2 is a flowchart of a method, in accordance with the present invention.

FIG. 2 illustrates a flowchart of a method for adaptive data rate-limiting in a wireless communication device, in accordance with the present invention. The method includes a step 200 of establishing a maximum data processing rate among at least one cryptographic algorithm. This step can be accomplished by processing data in the communication device with each algorithm-combination, and determining what data rate of the processed data results in a processor utilization of 100%, or determining an amount of time the device processor needs to process a known amount of data, and calculating a data rate that would result in a processor utilization of 100%.

A next step 202 includes weighting the processing rate of each cryptographic algorithm by a predetermined factor. This step can include reducing the data rate to at least a threshold data rate where the device provides stable operation. This step can further include a weighting factor for each of the various combinations of the at least one cryptographic algorithm.

A next step 204 includes adapting data rate of a transceiver of the communication device based on the at least one cryptographic algorithm being used in the communication device and its associated weighted processing rate. This step includes changing the data rate of the transceiver to, at most, the weighted processing rate of the at least one cryptographic algorithm having the lowest processing rate. The weighting factor(s) can be dynamically adjusted as described above.

A next step 206 includes detecting a change in communication streams of the communication device, whereupon the steps 200-204 of the method are repeated.

Advantageously, the system and method described herein can automatically and dynamically adapt to changes in security algorithm combinations that are in use at a given time. By adaptively rate limiting a software-based cryptography module, it is ensured that the processor is not running at 100% load at any given point of time and hence the real time device runs stable. The present invention also ensures that normal traffic that does not require security (like IPSec) gets processed and avoids congestion. The present invention can be used in networking devices like routers, access points and any other real-time communication devices that use software based cryptography modules.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless communication device for adaptive data rate-limiting, the device comprising:
   a transceiver operable to exchange communication streams with a network and have a data rate of these streams being adaptable;
   a security module operable to execute at least one cryptographic algorithm;
   a processor coupled to the transceiver and security module, the processor operable to process data at different cryptographic processing rates for different cryptographic algorithms of the security module, and to establish a maximum cryptographic processing rate among all the cryptographic algorithms of the security module; and
   a data rate limiter coupled to the processor, the data rate limiter operable to weight the cryptographic processing rate of each cryptographic algorithm of the security module relative to the maximum cryptographic processing rate and adapt a data rate of the transceiver of the communication device by the processor based on the maximum cryptographic processing rate and the cryptographic algorithm being used in the communication device and its associated weighted cryptographic processing rate; and
   wherein the processor can establish the maximum cryptographic processing rate by cryptographically processing data in the communication device with each cryptographic algorithm-combination, and determining which cryptographic algorithm-combination results in a processor utilization of 100%, wherein the cryptographic processing data rate of that cryptographic algorithm-combination is established as the maximum cryptographic processing rate.

2. The device of claim 1, wherein the processor is operable to change the data rate of the transceiver to, at most, the weighted cryptographic processing rate of the at least one cryptographic algorithm having the lowest cryptographic processing rate.

3. The device of claim 1, wherein the processor can establish the maximum cryptographic processing rate by determining an amount of time the processor needs to cryptographically process a known amount of data, and calculating a communication data rate that would result in a processor utilization of 100%.

4. The device of claim 1, wherein the data rate limiter weights the cryptographic processing rate of each cryptographic algorithm by reducing the transceiver data rate to at least a threshold data rate where the device provides stable operation of the processor at less than 100% load.

5. The device of claim 4, wherein the data rate limiter further weights the cryptographic processing rate of each cryptographic algorithm by includes a weighting factor scaled relative to the maximum cryptographic processing rate for each of the various combinations of the at least one cryptographic algorithm.

6. The device of claim 5, wherein the processor is further operable to detect a change in communication streams in the transceiver, whereupon the data rate limiter can re-adapt the weightings.

7. The device of claim 5, wherein, upon a change of device having a different processor speed but having the same platform parameters, the processor can re-establish a maximum cryptographic processing rate of a fastest cryptographic algorithm, and utilize the previously determined relatively scaled weighting factors for each of the various combinations of the at least one cryptographic algorithm on that changed device.

8. A method for adaptive data rate-limiting in a wireless communication device, the method comprising the steps of:
   providing a transceiver operable to exchange communication streams with a network and have a data rate of these streams being adaptable, and providing a security module operable to execute at least one cryptographic algorithm, and providing a processor coupled to the transceiver and security module, the processor operable to process data at different cryptographic processing rates for different cryptographic algorithms of the security module;
   establishing a maximum cryptographic processing rate among all the cryptographic algorithms of the security module;
   weighting the cryptographic processing rate of each cryptographic algorithm of the security module relative to the maximum cryptographic processing rate; and
   adapting a data rate of the transceiver of the communication device based on the maximum cryptographic processing rate and the cryptographic algorithm being used in the communication device and its associated weighted cryptographic processing rate; and
   wherein establishing includes cryptographically processing data in the communication device with each cryptographic algorithm-combination, and determining which cryptographic algorithm-combination results in a processor utilization of 100%, wherein the cryptographic processing data rate of that cryptographic algorithm-combination is established as the maximum cryptographic processing rate.

9. The method of claim 8, wherein adapting includes changing the data rate of the transceiver to, at most, the weighted cryptographic processing rate of the at least one cryptographic algorithm having the lowest cryptographic processing rate.

10. The method of claim 8, wherein establishing includes determining an amount of time the device processor needs to cryptographically process a known amount of data, and calculating a data rate that would result in a processor utilization of 100%.

11. The method of claim 8, wherein weighting includes reducing the transceiver data rate to at least a threshold data rate where the device provides stable operation of the processor at less than 100% load.

12. The method of claim 11, wherein weighting further includes a weighting factor scaled relative to the maximum cryptographic processing rate for each of the various combinations of the at least one cryptographic algorithm.

13. The method of claim 12, further comprising detecting a change in communication streams of the communication device, whereupon the steps of the method are repeated.

14. The method of claim 12, wherein adapting includes, upon a change of device having a different processor speed but having the same platform parameters, re-establishing a maximum cryptographic processing rate of a fastest cryptographic algorithm, and utilize the previously determined relatively scaled weighting factors for each of the various combinations of the at least one cryptographic algorithm on that changed device.

* * * * *